United States Patent [19]
Butler

[11] Patent Number: 4,738,590
[45] Date of Patent: Apr. 19, 1988

[54] BLADE PITCH VARYING MECHANISM

[75] Inventor: Lawrence Butler, Cincinnati, Ohio

[73] Assignee: General Electric Company, Cincinnati, Ohio

[21] Appl. No.: 905,213

[22] Filed: Sep. 9, 1986

[51] Int. Cl.$^4$ .............................................. B64C 11/48
[52] U.S. Cl. ..................................... 416/129; 416/160
[58] Field of Search .................... 416/160, 127, 157 B, 416/129, 158; 60/39.162, 226.1

[56] References Cited

U.S. PATENT DOCUMENTS

| | | | |
|---|---|---|---|
| 2,906,143 | 9/1959 | Musser | 416/160 X |
| 3,467,198 | 9/1969 | Ellinger | 416/193 R |
| 3,672,788 | 6/1972 | Ellinger | 416/160 X |
| 3,825,370 | 7/1974 | McMurtry et al. | 416/160 |
| 3,893,789 | 7/1975 | Andrews | 416/160 |
| 3,964,839 | 6/1976 | Kusiak | 416/155 X |
| 4,099,427 | 7/1978 | Fickelscher | 74/640 X |
| 4,488,399 | 12/1984 | Robey et al. | 416/171 X |
| 4,521,158 | 6/1985 | Fickelscher | 416/160 |
| 4,621,978 | 11/1986 | Stuart | 416/127 |
| 4,657,484 | 4/1987 | Wakeman et al. | 416/127 |

FOREIGN PATENT DOCUMENTS

| | | | |
|---|---|---|---|
| 579067 | 7/1924 | France | 416/160 |
| 1196588 | 7/1970 | United Kingdom | 416/160 |
| 1445107 | 8/1976 | United Kingdom | 416/160 |
| 2129502 | 5/1984 | United Kingdom | 416/128 |

OTHER PUBLICATIONS

Aerospace America, Oct. 1984, pp. 52–55.

Primary Examiner—Everette A. Powell, Jr.
Attorney, Agent, or Firm—Derek P. Lawrence

[57] ABSTRACT

An apparatus for varying the pitch of propulsor blades of a gas-turbine engine by eccentrically driven gears. A first gear is coaxially coupled to one of the propulsor blades whereby angular displacement of the first gear with respect to an engine center-line causes angular displacement of the propulsor blade. A second gear is rotatably coupled to the first gear with one of the first gear and second gear being a first internal gear and the other being a first mating gear. The first internal gear is eccentrically disposed with respect to the first mating gear and has more teeth than does the first mating gear. A third gear is rigidly coupled to the second gear. A fourth gear is rigidly coupled to a rotating structure of the engine and rotatably coupled to the third gear with one of the third gear and fourth gear being a second internal gear and the other being a second mating gear. The second internal gear is eccentrically disposed with respect to the second mating gear. The blade pitch mechanism also includes a mechanism for eccentrically revolving the second and third gears with respect to the first and fourth gears respectively, whereby the first gear is angularly displaced with respect to the fourth gear.

33 Claims, 4 Drawing Sheets

BLADE PITCH VARYING MECHANISM

FIELD OF THE INVENTION

This invention relates generally to mechanisms for varying the pitch of propulsor blades of gas turbine engines and, more particularly, to a pitch varying mechanism for fan blades of an unducted type gas turbine engine.

BACKGROUND OF THE INVENTION

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which in turn drives the compressor. Many engines further include a second turbine, known as a power turbine, located aft of the gas generator and which extracts energy from the gas stream to drive a rotating load with variable pitch blades such as found in the propulsor of helicopters, ducted turbo-fan engines, and turbo-prop engines.

A recent improvement over the turbo-fan and turbo-prop engines described above is the unducted fan engine such as disclosed in U.S. patent application Ser. No. 437,923—Johnson, filed Nov. 1, 1982. In the unducted fan engine, the power turbine includes counterrotating rotors and turbine blades which drive counterrotating unducted fan blades radially located with respect to the power turbines.

The fan blades of the unducted fan engine are variable pitched blades to achieve optimum performance. During operation, fuel efficiency of the engine can be increased by varying the pitch of the blade to correspond to specific operating conditions.

In one prior art apparatus, when it is desired to change the pitch of fan blades coupled to a rotating member which was concentrically disposed about a stationary member, the pitch is varied by a bearing arrangement coupled to a gearing arrangement. One such mechanism is described in U.S. patent application Ser. No. 647,283 filed Sept. 4, 1984 now U.S. Pat. No. 4,657,484. There, the pitch of fan blades is varied by a hydraulic actuator mounted inside the static power turbine support structure. The motion from the actuator is first transmitted to the rotating member by a system of bearings and then to the blades by a system of gears and linkages mounted on the rotating member. It is believed that one disadvantage of using such a pitch change mechanism is the weight of the mechanism. A large actuation force is required to vary the pitch of the propulsor blade as well as to maintain a particular blade pitch when the engine is producing a thrust. Since the actuation force must be transferred to the blade by way of the bearings, gears and linkages, the bearings, gears and linkages must be sufficiently sturdy to transfer the forces without substantially deflecting or deforming. Any deflection or deformation of the mechanism may cause play in the system and, consequently, cause the fan blades to flutter slightly as they are rotated and may also cause a torsional imbalance on the engine. In order for the mechanism to be sufficiently sturdy, it must be massive. The weight of the mechanism added to the rotating member may detrimentally affect the efficiency of the system by increasing the inertia required to turn the rotating member. It is believed another disadvantage of the prior art blade pitch varying mechanism is the accessibility of the mechanism. A large portion of the mechanism is built into the stationary power turbine structure. In order to access this portion, one must penetrate the power turbine. Consequently, the location of the mechanism makes access and maintainability quite difficult. It is believed that a further disadvantage of the prior art blade pitch mechanism is wearability of the mechanism. The mechanism employs a plurality of racks connected to a corresponding plurality of pinion gears. Positioning of the pinion gears by the racks varies the pitch of the blades. For any given rack and pinion, only a few gear teeth of the pinion will intermesh with a few gear teeth on the rack. Accordingly, the entire force required to maintain a particular blade pitch is carried by these intermeshing teeth. During normal flight and normal operation of the engine, the blade pitch angle will remain relatively constant. Thus, the few intermeshing teeth may wear and/or fail whereas the other teeth may have very little wear.

SUMMARY OF THE INVENTION

Among the objects of the present invention is the provision of an improved apparatus for varying the pitch of propulsor blades in an unducted fan engine which overcomes the above discussed disadvantageous or undesirable features, as well as others, of the prior art. It is another object of the present invention to provide an apparatus for varying blade pitch which is relatively light in weight. It is a further object of the present invention to provide an apparatus for varying blade pitch which is easily accessible. It is yet another object of the present invention to provide an apparatus for varying blade pitch in which a force for maintaining a particular blade pitch is distributed over a large number of gear teeth. These, as well as other features, objects and advantages of the present invention will be in part apparent and in part pointed out hereinafter.

In one embodiment, the present invention is directed to an apparatus for varying blade pitch in a propeller driven gas turbine engine. The engine includes a rotating structure and a plurality of variable pitch propulsor blades extending radially outwardly from the rotating structure. The pitch of the blade is varied by a plurality of gears coupling the rotating structure to the propulsor blade and rotating the gears. A first gear is coaxially coupled to one of the propulsor blades whereby angular displacement of the first gear with respect to the rotating structure causes angular displacement of the propulsor blade. A second gear is rotatably coupled to the first gear with one of the first gear and second gear being a first internal gear and the other of the first gear and second gear being a first mating gear. The first internal gear is eccentrically disposed with respect to the first mating gear and has more teeth than does the first mating gear with the gear teeth of both gears being dimensioned for intermeshing. A third gear is rigidly coupled to the second gear. A fourth gear is rigidly coupled to the rotating structure and rotatably coupled to the third gear with one of the third gear and fourth gear being a second internal gear and the other of the third gear and fourth gear being a second mating gear. The second internal gear is eccentrically disposed with respect to the second mating gear and has more gear teeth than does the second mating gear with the gear teeth of both the second internal gear and the second mating gear being dimensioned for intermeshing. The system also includes a mechanism for eccentrically revolving the second gear and the third gear with respect to the first gear and the fourth gear respectively, whereby the first gear is angularly displaced with respect to the fourth gear.

BRIEF DESCRIPTION OF THE DRAWING

The present invention is illustrated by way of example in the figures of the accompanying drawing in which.

Corresponding reference characters indicate corresponding parts throughout the several views of the drawings.

The exemplification set out herein illustrate the preferred embodiments of the present invention in one form thereof, and such exemplifications are not to be construed as limiting either the scope of the invention or the scope of the disclosure thereof in any manner.

DETAILED DESCRIPTION OF THE PREFERRED EMBODIMENTS

Figure 1:
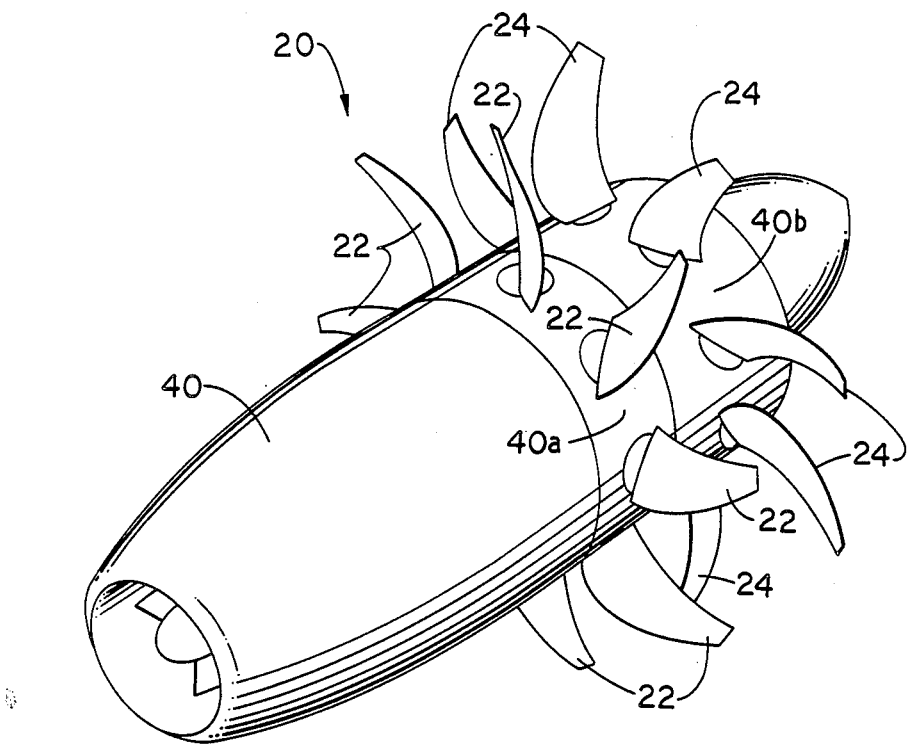
FIG. 1 illustrates a prospective view of an unducted fan type gas-turbine engine.
Figure 2:
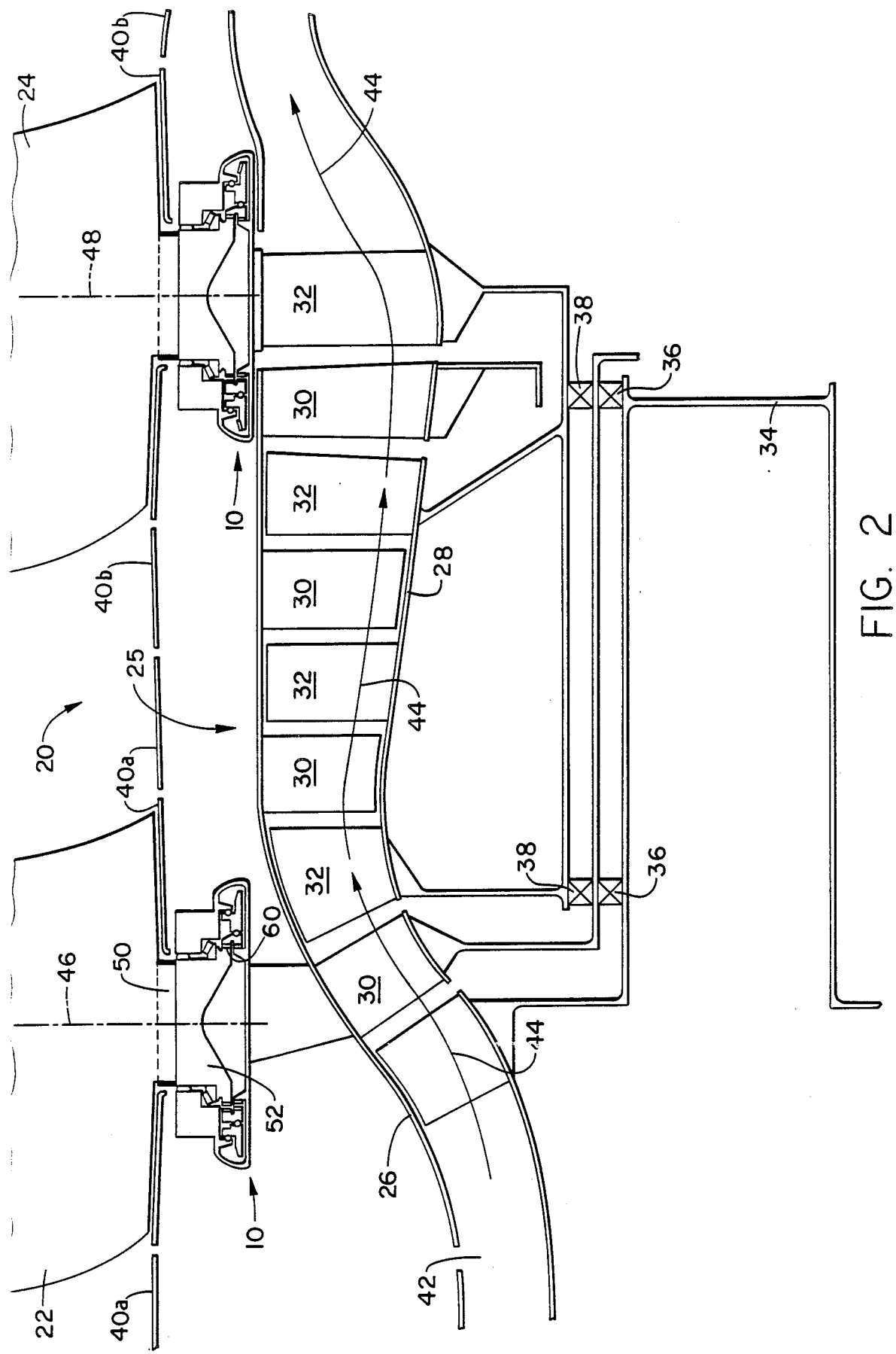
FIG. 2 illustrates a side elevation view, in section, of a turbine section of the unducted fan type gas-turbine engine.

FIGS. 1 and 2 illustrate an unducted fan (UDF) jet engine 20 having forward and aft counter rotating propulsor blades 22 and 24 disposed radially outwardly of a power turbine 25. The power turbine 25 includes first and second counter rotating rotors 26 and 28 and first and second counter rotating turbine blades 30 and 32 coupled to the first and second rotors 26 and 28, respectively. The forward and aft propellers 22 and 24 are respectively coupled to the first and second rotors 26 and 28 and rotate therewith. The first rotor 26 is disposed about a hollow static structure 34 and rotatably connected to the static structure 34 by way of first bearings 36. The second rotor 28 is also disposed about the static structure 34 and rotatably coupled to the first rotor 26 by way of second bearings 38. An outer shroud or nacelle 40 encompasses the rotors 26 and 28 with the propulsor blades 22 and 24 disposed radially outwardly of the nacelle 40. The nacelle 40 includes a first sleeve 40a which is coupled to and rotatable with the forward propulsor blades 22, and a second sleeve 40b coupled to and rotatable with the aft propulsor blades 24. The purpose of the nacelle 48 is to provide the proper air flow characteristics to optimize the performance of the propulsor blades 22 and 24. The engine 20 further includes an annular gas flowpath 42 formed through the first and second rotors 26 and 28. Air passing through the engine 20 and to the gas flowpath 42 is compressed and heated to form a high energy (high pressure/high temperature) gas stream, denoted generally by arrow 44. The high energy gas stream 44 flows through the first and second rotors 26 and 28 to turn the counter rotating turbine blades 30 and 32 to drive the counter rotating propulsor blades 22 and 24, respectively.

To further optimize the performance of the unducted fan engine 20 it is desirable to vary the pitch of the propulsor blades 22 and 24. Each of the forward propulsor blades 22 has a pitch change axes 46 and each of the aft propulsor blades 24 has a pitch change axes 48 about which the pitch of the blades 22 and 24 may vary. The pitch of the propulsor blades 22 and 24 are varied by a pitch varying mechanism, denoted generally by the reference numeral 10, coupled to each of the propulsor blades 22 and 24. For ease of discussion, only the pitch varying mechanisms 10 for the forward propulsor blades 22 will be discussed in greater detail below. However, it is to be understood that similar pitch varying mechanisms may be employed for varying the pitch of the aft propulsor blades 24.

Figure 3:
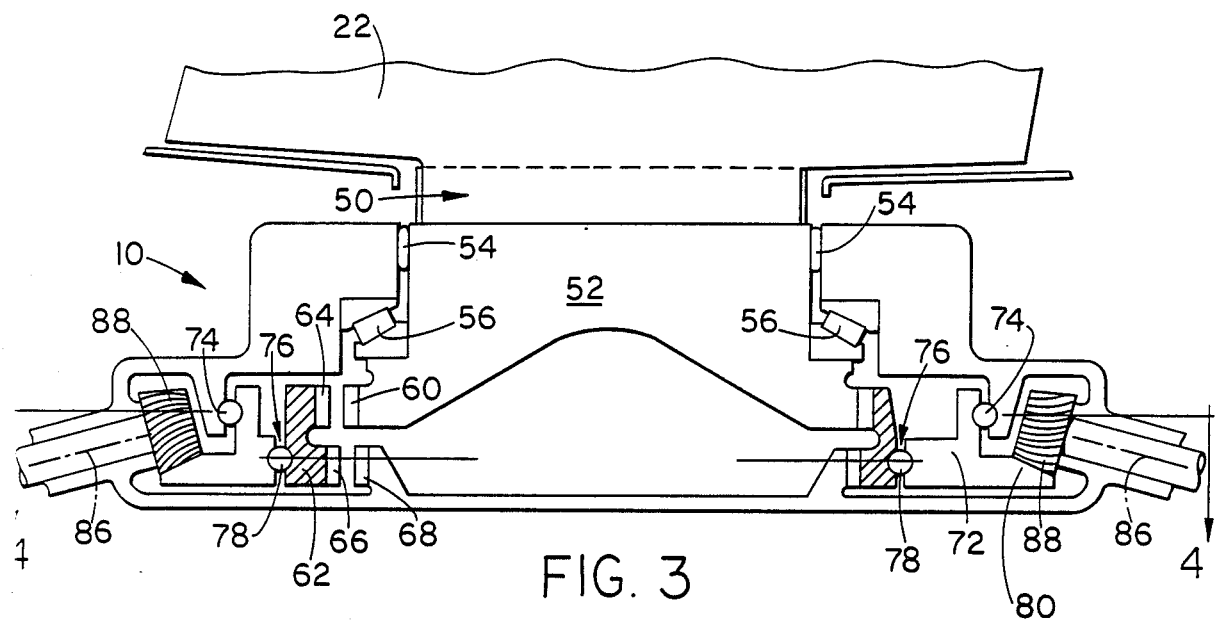
FIG. 3 is an enlarged section view of FIG. 2 illustrating a propulsor blade coupled to a rotating structure.
Figure 4:
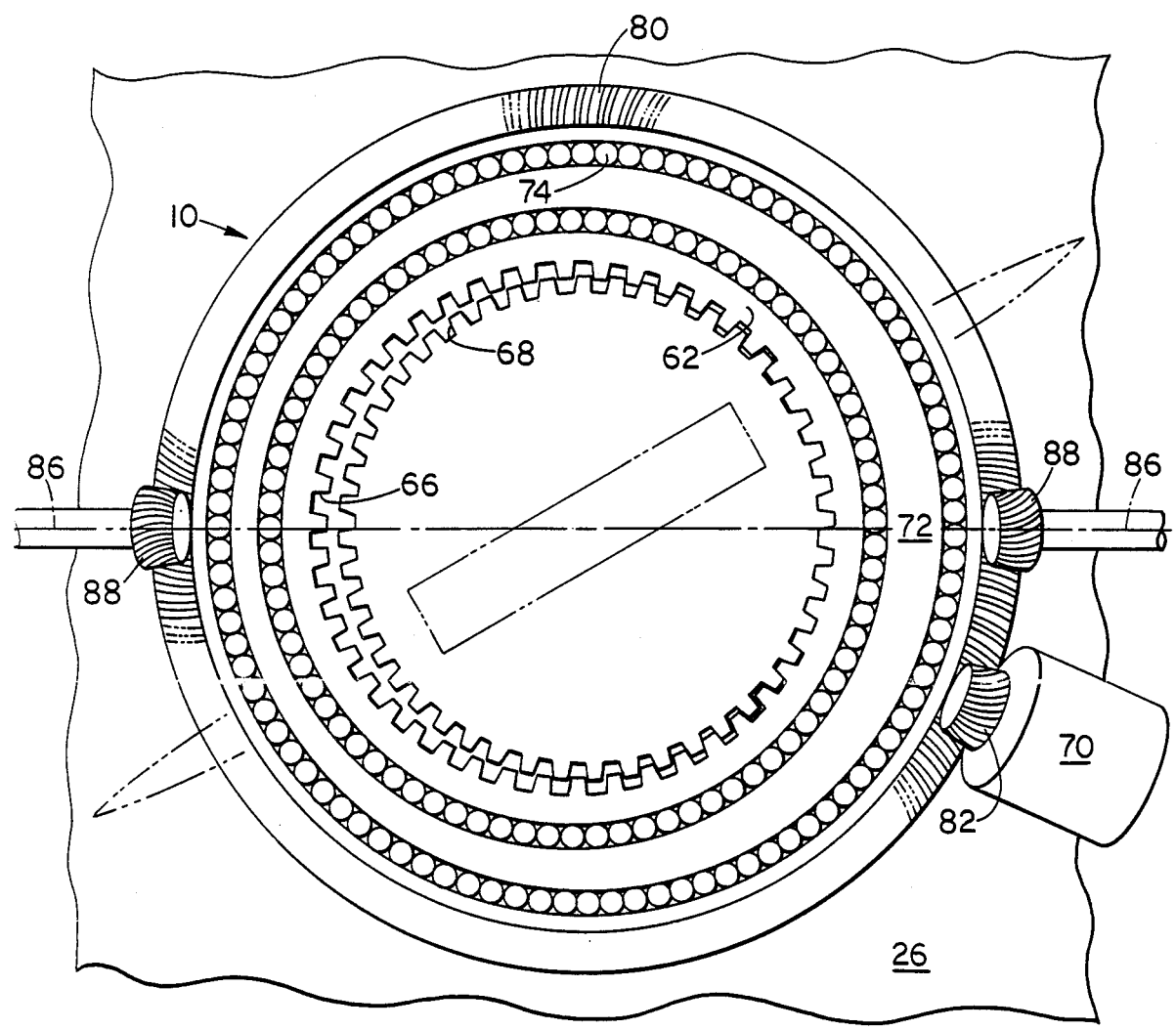
FIG. 4 is a top section view of the blade pitch varying mechanism taken along the line 4—4 of FIG. 3.
Figure 5:
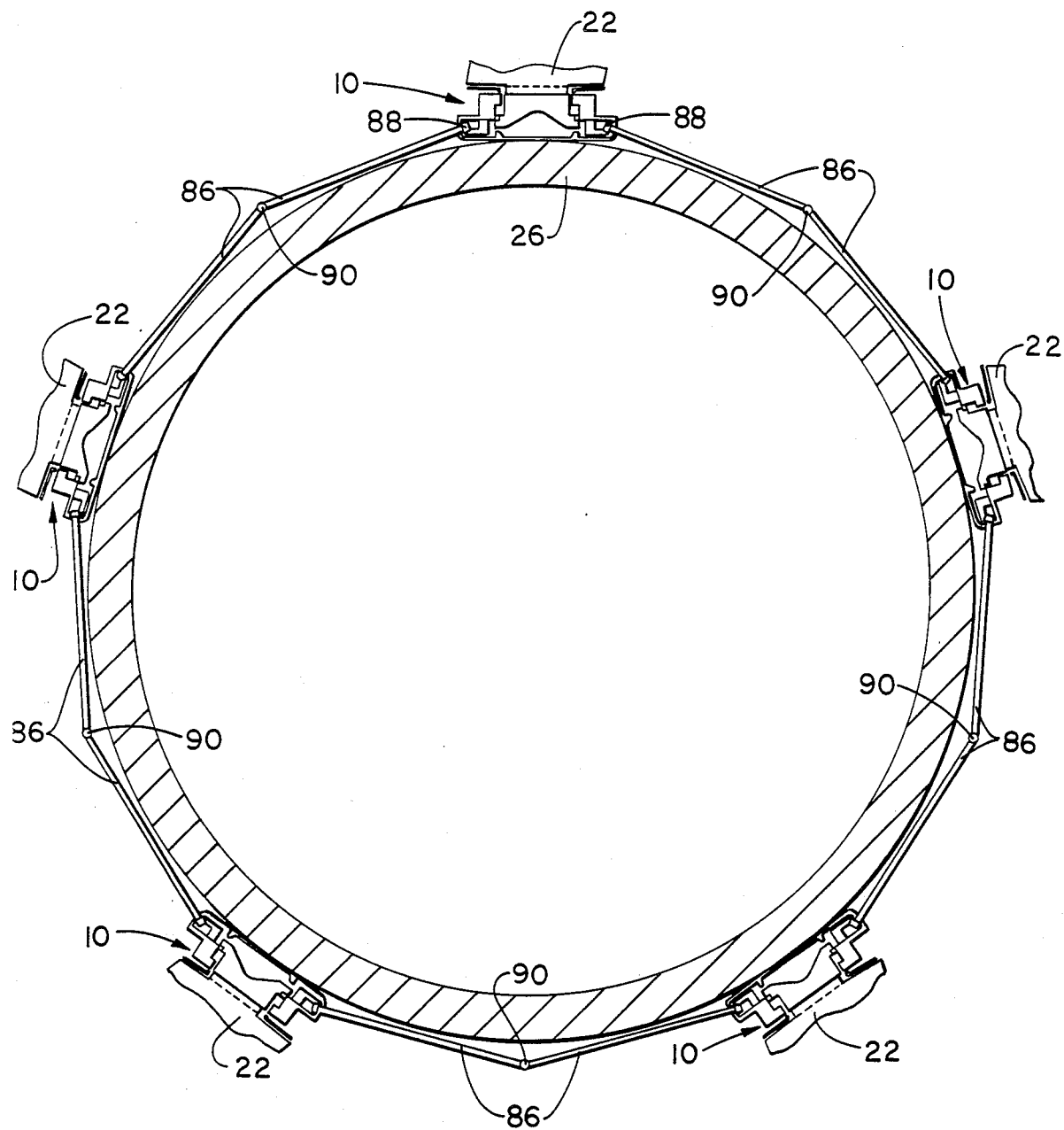
FIG. 5 is a cross-section view of the gas-turbine engine illustrating a blade pitch varying mechanism coupled to each propulsor blade on a single blade row.

With reference to FIGS. 3 through 5 in general, there is illustrated in one form of the invention a pitch varying mechanism 10. Extending radially inwardly of the propulsor blade 22 is a blade root portion 50 fixedly mounted to a trunnion 52. The trunnion 52 is pivotally coupled to the first rotor 26 such that angularly displacing the trunnion 52 with respect to the first rotor 26, i.e., rotating the trunnion 52 about a radius of the engine 20, varies the pitch of the propulsor blades 22. The pitch varying mechanism 10 of the present invention includes a first mating gear 60 coaxially coupled to the trunnion 52, an annulus 62 having first and second internal gears 64 and 66 coaxially disposed about an internal surface of the annulus 62 and a second mating gear 68 rigidly coupled to the first rotor 26 and coaxial with the first mating gear 60. The first internal gear 64 is radially disposed about the first mating gear 60 and has more gear teeth than does the first mating gear 60 with the gear teeth of both gears 60 and 64 being dimensioned for intermeshing. Additionally, the second internal gear 66 is radially disposed about the second mating gear 68 and has more gear teeth than does the second mating gear 68 with the gear teeth of both the second internal gear 66 and the second mating gear 68 being dimensioned for intermeshing. The annulus 62 and the associated internal gears 64 and 66 are eccentrically revolved about the mating gears 60 and 68 such that the first mating gear 60 is angularly displaced (rotated) with respect to the second mating gear 68. Since the first mating gear 60 is rigidly coupled to the blade root portion 50 and the second mating gear is coupled to the first rotor 26, angularly displacing the first mating gear with respect to the second mating gear 68 varies the pitch of the propulsor blade 22.

More particular reference is now made to FIGS. 3 and 4 in conjunction with FIG. 2 which illustrate, in detail, the pitch varying mechanism 10. The blade root 50 of the propulsor blade 22 is rigidly coupled to the trunnion 52. The trunnion is mounted to a portion of the first rotor 26 by way of appropriate roller bearings 54 and thrust bearings 56, well known in the art. The bearings 54 and 56 connect the trunnion 52 to the first rotor 26 so the trunnion 52 can pivot with respect to the first rotor 26 to vary the pitch of the blade 22. The first mating gear 60 is preferably a spur gear and is coaxially fixed about the base of the trunnion 52. The second mating gear 68 is rigidly fixed to the first rotor 26 and disposed radially inwardly of the first mating gear 60 with respect to the first rotor 26. Preferably, the second mating gear 68 is also a spur gear and is coaxial with the first mating gear 60. The first and second internal or annular gears 62 and 64, as well as the annulus 62 encompass the first and second mating gears 60 and 68. An internal or annular gear is by definition a gear having gear teeth on an internal surface. The first internal gear 64 and the second internal gear 66 are eccentrically disposed about the first mating gear 60 and second mating gear 68, respectively, such that the teeth on a portion of the first internal gear 64 intermeshes with teeth on a corresponding portion of the first mating gear 60 and the teeth on a portion of the second internal gear 66 intermeshes with teeth on a corresponding portion of the second mating gear. The second internal gear 64 is eccentrically revolved about the second mating gear 68. Since the first internal gear 64 is rigidly secured to the second internal gear 66, the first internal gear 64 is revolved about the first mating gear 60. Eccentrically revolving the internal gears 64 and 66 about the mating gears 60 and 68 will rotate the first mating gear 60 with respect to the second mating gear 68 only if the ratio of the number of gear teeth of the first internal gear 64 to the number of teeth of the firt mating gear 60, denoted generally as $R_1$, is not equal to the ratio of the number of gear teeth of the second internal gear 62 to the number of gear teeth on the second mating gear 68 denoted generally as $R_2$. However, if the two gear teeth ratios $R_1$ and $R_2$ are equal, eccentrically revolving the annulus 62 about the two mating gears 60 and 68 will not rotate the first mating gear 60 with respect to the second mating gear 68 and, consequently, will not vary the pitch of the propulsor blade 22.

An understanding of the principle of operation of the gearing arrangement makes apparent the fact that the ratios must be different in order to vary the pitch of the propulsor blade 22. Since the second internal gear 66 has more gear teeth than does the second mating gear 68, each complete revolution or orbit which the second internal gear 66 makes about the second mating gear 68 causes the second internal gear 68 to recede with respect to the second mating gear 68 by the difference in the number of teeth between the second internal gear 66 and the second mating gear 68. Each complete revolution or orbit which the first internal gear 64 makes about the first mating gear 60 causes the first mating gear 60 to advance or rotate with respect to the first internal gear 64 by the difference of the number of teeth between the first internal gear 64 and the first mating gear 60. The reduction ratio between the second mating gear 68 and the first mating gear 60 may be defined as the number of orbit cycles of the annulus 62 required to rotate the first mating gear 60 one complete revolution or three hundred and sixty degrees. The reduction ratio is given by the equation:

$$R = [1 - (N_{m2}/N_{i2})(N_{i1}/N_{m1})]^{-1},$$

where R is the reduction ratio, $N_{m1}$ is the number of gear teeth on the first mating gear, $N_{i1}$ is the number of gear teeth on the first internal gear 64, $N_{i2}$ is the number of gear teeth on the second internal gear 66, and $N_{m2}$ is the number of gear teeth on the second mating gear 68.

Suppose, for example, that the first internal gear 64 has fifty four gear teeth, the first mating gear 60 has fifty two gear teeth, the second internal gear 66 has forth eight teeth, and the second mating gear 68 has forty six gear teeth. For each orbit cycle that the second internal gear 66 makes about the second mating gear 68, forty six gear teeth of the second internal gear 66 meshes with corresponding gear teeth of the second mating gear 68. Since the second internal gear 66 has two more gear teeth than does the second mating gear 68, two gear teeth on the second internal gear do not mesh with gear teeth on the second mating gear 68 for each orbit cycle. Thus, the second internal gear 66 recedes, with respect to the second mating gear 68 by two gear teeth. Since there are forty eight gear teeth on the second internal gear 66, each gear tooth constitutes 7.5 degrees. Accordingly, a receding of two gear teeth is equivalent to a rotation of 15 degrees. For each orbit cycle that the first internal gear 64 makes, fifty two gear teeth of the first internal gear 64 meshes with corresponding gear teeth of the first mating gear 60. Since the first internal gear 64 has two more gear teeth than does the first mating gear 60, two extra gear teeth on the first mating gear 60 meshes with gear teeth on the first internal gear 64 for each orbit cycle of the second internal gear 66. Thus, the first mating gear 60 is advanced or negatively rotated with respect to the first internal gear 64 by two gear teeth. Since there are 54 gear teeth on the first internal gear 64, each gear tooth constitutes approximately 6.92 degrees. Accordingly, an advance of two gear teeth is equivalent to a positive rotation of approximately 13.85 degrees. However, the first internal gear 64 is coaxially fixed to the second internal gear 66. Since the second internal gear 66 is angularly displaced fifteen degrees with respect to the second mating gear 68, a complete orbit cycle of the second internal gear 66 about the second mating gear 68 translates into a first internal gear orbit of three hundred and forty five degrees about the first mating gear 60. Thus, for each complete orbit cycle of the second internal gear 66 about the second mating gear 68, the first mating gear 60 is angularly displaced with respect to the first internal gear by:

$$(13.58)(345/360) = 13.27 \text{ degrees}.$$

Accordingly, for each complete orbit cycle, the first mating gear 60 is angularly displaced with respect to the second mating gear 68 by:

$$15 - 13.27 = 1.73 \text{ degrees}.$$

Since each complete orbit cycle of the annulus 62 causes the first mating gear 60 to rotate 1.73 degrees with respect to the first rotor 26, two hundred and eight orbit cycles are required to rotate the first mating gear 60 and the corresponding propulsor blade 22 three hundred and sixty degrees. Thus, the reduction ratio R of the second mating gear 68 to the first mating gear 60 is two hundred and eight. The reduction ratio R can also be calculated by the equation given above:

$$R = [1 - (N_{m2}/N_{i2})(N_{i1}/N_{m1})]^{-1}$$
$$= [1 - (46/48)(54/52)]^{-1}$$
$$= 208$$

Preferably, a large reduction ratio exists between the second mating gear 68 and the first mating gear 60. As made apparent by the above equation, the reduction ratio is large if the first gear teeth ratio $R_1$ is close to the second gear teeth ratio $R_2$. However, if the gear teeth ratios $R_1$ and $R_2$ were identical, the reduction ratio would be infinite. Providing a large reduction ratio effectively increases the stiffness of the pitch varying mechanism 10 since a substantial movement of the annulus 62 translates into a small rotation of the first mating gear 60 and the corresponding propulsor blade 22. By rotating the first mating gear 60 with internal gears rather than with another spur gear, a large number of gear teeth intermesh and the torque imparted to the first mating gear 60 by the propulsor blade 22 is distributed over the large number of intermeshing teeth rather than just a few gear teeth. Consequently, the stresses and associated wear on each tooth are reduced. Furthermore, the larger the reduction ratio, the larger the number of gear teeth simultaneously intermeshing and the larger the dispersement of the torque imparted to the gear. Consequently, a large reduction ratio decreases the overall wear on the gears 60, 64, 66, and 68.

The eccentric revolving motion of the annulus 62 is accomplished by a motor 70 and bearings such as, for instance, a hydraulic motor or an electric motor. An outer race 72 is rotatably coupled to the first rotor 26 by way of appropriate bearings 74 such as, for instance, ball bearings. The outer race 72 includes a circular void 76 dimensioned to encompass the annulus 62. Appropriate bearings 78 are disposed between the outer race 72 and the annulus 62 to reduce the friction therebetween and permit the rotation of the annulus 62 with respect to the outer race 72. The circular void 76 is eccentrically disposed from the center of rotation of the outer race 72 such that the eccentricity of the circular void 76 is equivalent to the eccentricity of the internal gears 64 and 66 about the corresponding mating gears 60 and 68, respectively. The rotation of the outer race 72 with respect to the first rotor 26 effectuates an eccentric rotation of the circular void 76 such that the outer race 72 exerts radial forces on the annulus 62 to cause the second internal gear 66 to revolve about the second mating gear 68 and the first internal gear 64 to revolve about the first mating gear 60. An appropriate gear 80 such as, for instance, a first bevel gear is concentrically disposed about and rigidly coupled to the outer race 72. The motor 70 has a second bevel gear 82 dimensioned for intermeshing with the first bevel gear 80. The motor 70 is secured to the first rotor 26 so that rotation of the second bevel gear 82 effectuates the rotation of the outer race 72. Thus, the pitch change mechanism 10 of the present invention effectively converts the rotary motion 70 into a motion for varying the pitch of the propulsor blade 22.

Reference is now made to FIG. 5 in conjunction with FIGS. 3 and 4 to illustrate a mechanism for synchronizing the blade pitch angle for each propulsor blade 22. Preferably, identical pitch varying mechanisms 10 are coupled to each propulsor blade 22 on a given blade level. Synchronization of blade pitch angles for all the blade is accomplished by drive shafts 86 coupling the pitch varying mechanism 10 of each propulsor blade 22 to the adjacent blades 22 on the same blade row. Each drive shaft 86 has a third bevel gear 88 rigidly connected to one of its ends. The third bevel gear 88 is dimensioned for intermeshing with the first bevel gear 80 such that rotation of the first bevel gear 20 with respect to the first rotor 26 effectuates rotation of the drive shafts 86 about their longitudinal axes. The end of each drive shaft 86 opposite the corresponding bevel gear 88 has a universal joint 90, well known in the art, for coupling adjacent drive shafts together. The drive shaft 86 ensures the simultaneous rotation of each outer race 72 and, consequently, the simultaneous pitch variation for each propulsor blade 22. If the third bevel gears 88 have fewer gear teeth than do the intermeshing first bevel gears 80, the reduction ratio between the drive shafts 86 and the first mating gear 60 is greater than the reduction ratio between the second mating gear 68 and the first mating gear 60. If the reduction ratio between the second mating gear 68 and the first mating gear 60 is known, the reduction ratio of the drive shaft 86 to the first mating gear 60 can be determined by multiplying the reduction ratio of the second mating gear 68 and first mating gear 60 with the gear teeth ratio of the first bevel gear 80 to the third bevel gear 88. If this final reduction ratio is large, then a large rotation of the drive shafts 86 about their longitudinal axes is needed to slightly vary the pitch of the propulsor blades 22. Accordingly, blade pitch variation caused by play or backlash between the corresponding first and third bevel gears 80 and 88 will be negligible.

As illustrated in FIG. 2, the pitch varying mechanism 10 of the present invention is positioned adjacent to the blade root 50 and disposed outwardly of the gas flowpath 42. Positioning the mechanism 10 in this manner provides high accessibility since the power turbine itself need not be penetrated to service the mechanism 10. Thus, time and/or expense in servicing the blade pitch mechanism 10 is minimized.

While the principles of the invention have now been made clear in an illustrative embodiment, it will become obvious to those skilled in the art, many modifications in structure, arrangement, portions and components used in the practice of the invention and otherwise which are particularly adapted for specific operating requirements without departing from those principles. Accordingly, it is intended that the description be interpreted as illustrative and not in a limiting sense and that the invention be given a scope commensurate with the appended claims.

I claim:

1. A gas turbine engine comprising:
   (a) a stationary member;
   (b) first and second rotating structures coaxially disposed about said stationary member;
   (c) an annular gas flowpath coaxial with said first and second rotating structures;
   (d) a plurality of first and second rotor blades attached to said first and second rotating structures, respectively, and extending into said flowpath such that a gas stream flowing through said flowpath causes said first and said second rotating structures to counterrotate;
   (e) forward and aft rows of variable pitch propulsor blades coupled to and disposed radially outwardly of said first and second rotating structures, respectively;
   (f) a first gear coaxially coupled to one of said propulsor blades whereby angular displacement of said first gear about a radius of said rotating structure varies the pitch of said propulsor blade with respect to said rotating structure;
   (g) a second gear rotatably coupled to said first gear, one of said first gear and said second gear being a first internal gear and the other of said first gear and said second gear being a first mating gear, said first internal gear being eccentrically disposed with respect to said first mating gear and having more gear teeth than does said first mating gear with the gear teeth of both said first internal gear and said first mating gear being dimensioned for intermeshing;
   (h) a third gear rigidly coupled to said second gear;
   (i) a fourth gear rigidly coupled to said rotating structure and rotatably coupled to said third gear, one of said third gear and said fourth gear being a second internal gear and the other of said third gear and said fourth gear being a second mating gear, said second internal gear being eccentrically disposed with respect to said second mating gear and having more gear teeth than does said second mating gear with the gear teeth of both said second internal gear and said second mating gear being dimensioned for intermeshing; and (j) means for eccentrically revolving said second gear and said third gear with respect to said first gear and said fourth gear, respectively, whereby said first gear is angularly displaced with respect to said fourth gear.

2. Blade pitch varying means in accordance with claim 1 wherein:
 (a) said first gear comprises said first mating gear;
 (b) said second gear comprises said first internal gear;
 (c) said third gear comprises said second internal gear; and
 (d) said fourth gear comprises said second mating gear.

3. Blade pitch varying means in accordance with claim 2 wherein a ratio of the number of gear teeth of said first internal gear to the number of gear teeth of said first mating gear does not equal a ratio of the number of gear teeth of said second internal gear to the number of gear teeth of said second mating gear.

4. Blade pitch varying means in accordance with claim 3 wherein said first mating gear and said second mating gear are coaxially located with respect to one another.

5. Blade pitch varying means in accordance with claim 4 wherein said first internal gear and said second internal gear are both coaxially disposed within a rigid annulus.

6. Blade pitch varying means in accordance with claim 5 wherein said revolving means comprise:
 (a) an outer race rotatably coupled to said rotating structure and including a circular void eccentric to the rotation of said outer race, said circular void being dimensioned to encompass said annulus whereby the rotation of said outer race effectuates an eccentric rotation of said circular void such that said outer race exerts radial forces on said annulus to cause said second internal gear to revolve about said second mating gear and said first internal gear to revolve about said first mating gear; and
 (b) means for rotating said outer race with respect to said rotating structure.

7. Blade pitch varying means in accordance with claim 6 further comprising bearing means between said annulus and said outer race for reducing friction therebetween.

8. Blade pitch varying means in accordance with claim 6 wherein said rotating means comprise:
 (a) a fifth gear radially disposed about said outer race; and
 (b) motor means secured to said rotating structure and coupled to said fifth gear for rotating said fifth gear.

9. Blade pitch varying means in accordance with claim 8 wherein said motor means comprise a hydraulic motor.

10. Blade pitch varying means in accordance with claim 8 wherein said fifth gear comprises a bevel gear.

11. Blade pitch varying means in accordance with claim 10 further comprising means for synchronizing the pitch of all said propulsor blades on one of said rows.

12. In a gas turbine engine including a stationary member, a rotating structure coaxially disposed about a stationary member, an annular gas flowpath coaxial with the rotating structure, a plurality of rotor blades coupled to the rotating structure and extending into the gas flowpath such that a gas stream flowing through the flowpath causes the rotating structure to rotate with respect to the stationary member, and a plurality of variable pitch propulsor blades coupled to and disposed radially outwardly of the rotating structure, means disposed radially outwardly of the annular gas flowpath for varying the pitch of the propulsor blades comprising:
 (a) a first gear coaxially coupled to one of the propulsor blades whereby angular displacement of said first gear about a radius of the rotating structure causes a pitch change of the propulsor blade;
 (b) a second gear rotatably coupled to said first gear, one of said first gear and said second gear being a first internal gear and the other of said first gear and said second gear being a first mating gear, said first internal gear being eccentrically disposed with respect to said first mating gear and having more gear teeth than does said first mating gear with the gear teeth of both said first internal gear and said first mating gear being dimensioned for intermeshing;
 (c) a third gear rigidly coupled to said second gear;
 (d) a fourth gear rigidly coupled to the rotating structure and rotatably coupled to said third gear, one of said third gear and said fourth gear being a second internal gear and the other of said third gear and said fourth gear being a second mating gear, said second internal gear being eccentrically disposed with respect to said second mating gear and having more gear teeth than does said second mating gear with the gear teeth of both said second internal gear and said second mating gear being dimensioned for intermeshing; and
 (e) means for eccentrically revolving said second gear and said third gear with respect to said first gear and said fourth gear, respectively, whereby said first gear is angularly displaced with respect to said fourth gear.

13. Blade pitch varying means in accordance with claim 12 wherein:
 (a) said first gear comprises said first mating gear;
 (b) said second gear comprises said first internal gear;
 (c) said third gear comprises said second internal gear; and
 (d) said fourth gear comprises said second mating gear.

14. Blade pitch varying means in accordance with claim 13 wherein a ratio of the number of gear teeth of said first internal gear to the number of gear teeth of said first mating gear does not equal a ratio of the number of gear teeth of said second internal gear to the number of gear teeth of said second mating gear.

15. Blade pitch varying means in accordance with claim 14 wherein said first mating gear and said second mating gear are coaxially located with respect to one another.

16. Blade pitch varying means in accordance with claim 15 wherein said first internal gear and said second internal gear are both coaxially disposed with a rigid annulus.

17. Blade pitch varying means in accordance with claim 16 wherein said revolving means comprise:
(a) an outer race rotatably coupled to the rotating structure and including a circular void eccentric to the rotation of said outer race, said circular void being dimensioned to encompass said annulus whereby the rotation of said outer race effectuates an eccentric rotation of said circular void such that said outer race exerts radial forces on said annulus to cause said second internal gear to revolve about said second mating gear and said first internal gear to revolve about said first mating gear; and
(b) means for rotating said outer race with respect to the rotating structure.

18. Blade pitch varying means in accordance with claim 17 further comprising bearing means between said annulus and said outer race for reducing friction therebetween.

19. Blade pitch varying means in accordance with claim 17 wherein said rotating means comprise:
(a) a fifth gear radially disposed about said outer race; and
(b) motor means secured to the rotating structure and coupled to said fifth gear for rotating said fifth gear.

20. Blade pitch varying means in accordance with claim 19 wherein said motor means comprise a hydraulic motor.

21. Blade pitch varying means in accordance with claim 19 wherein said fifth gear comprises a bevel gear.

22. Blade pitch varying means in accordance with claim 21 further comprising means for synchronizing the pitch of all the propulsor blades.

23. In a gas turbine engine including a rotating structure and a plurality of variable pitch propulsor blades extending radially outwardly from the rotating structure, means for varying the pitch of the propulsor blades comprising:
(a) a first gear coaxially coupled to one of the propulsor blades whereby angular displacement of said first gear about a radius of the rotating structure causes a pitch change of the propulsor blade;
(b) a second gear rotatably coupled to said first gear, one of said first gear and said second gear being a first internal gear and the other of said first gear and said second gear being a first mating gear, said first internal gear being eccentrically disposed with respect to said first mating gear with the gear teeth of both said first internal gear and said first mating gear being dimensioned for intermeshing;
(c) a third gear rigidly coupled to said second gear;
(d) a fourth gear rigidly coupled to the rotating structure and rotatably coupled to said third gear, one of said third gear and said fourth gear being a second internal gear and the other of said third gear and said fourth gear being a second mating gear, said second internal gear being eccentrically disposed with respect to said second mating gear and having more gear teeth than does said second mating gear with the gear teeth of both said second internal gear and said second mating gear being dimensioned for intermeshing; and
(e) means for eccentrically revolving said second gear and said third gear with respect to said first gear and said fourth gear, respectively, whereby said first gear is angularly displaced with respect to said fourth gear.

24. Blade pitch varying means in accordance with claim 23 wherein:
(a) said first gear comprises said first mating gear;
(b) said second gear comprises said first internal gear;
(c) said third gear comprises said second internal gear; and
(d) said fourth gear comprises said second mating gear.

25. Blade pitch varying means in accordance with claim 24 wherein a ratio of the number of gear teeth of said first internal gear to the number of gear teeth of said first mating gear does not equal a ratio of the number of gear teeth of said second internal gear to the number of gear teeth of said second mating gear.

26. Blade pitch varying means in accordance with claim 25 wherein said first mating gear and said second mating gear are coaxially located with respect to one another.

27. Blade pitch varying means in accordance with claim 26 wherein said first internal gear and said second internal gear are both coaxially disposed within a rigid annulus.

28. Blade pitch varying means in accordance with claim 27 wherein said revolving means comprise:
(a) an outer race rotatably coupled to the rotating structure and including a circular void eccentric to the rotation of said outer race, said circular void being dimensioned to encompass said annulus whereby the rotation of said outer race effectuates an eccentric rotation of said circular void such that said outer race exerts radial forces on said annulus to cause said second internal gear to revolve about said second mating gear and said first internal gear to revolve about said first mating gear; and
(b) means for rotating said outer race with respect to the rotating structure.

29. Blade pitch varying means in accordance with claim 28 further comprising bearing means between said annulus and said outer race for reducing friction therebetween.

30. Blade pitch varying means in accordance with claim 28 wherein said rotating means comprise:
(a) a fifth gear radially disposed about said outer race; and
(b) motor means secured to the rotating structure and coupled to said fifth gear for rotating said fifth gear.

31. Blade pitch varying means in accordance with claim 30 wherein said motor means comprise a hydraulic motor.

32. Blade pitch varying means in accordance with claim 30 wherein said fifth gear comprises a bevel gear.

33. Blade pitch varying means in accordance with claim 32 further comprising means for synchronizing the pitch of all the propulsor blades.

* * * * *